United States Patent
Waldman et al.

(10) Patent No.: US 6,284,278 B1
(45) Date of Patent: Sep. 4, 2001

(54) CONTROLLED RELEASE CHEMICALS

(75) Inventors: Daniel Waldman, Katzrin; Emil Polyansky, Carmiel, both of (IL)

(73) Assignee: Contrix Ltd., Katzrin (IL)

( * ) Notice: Subject to any disclaimer, the term of this patent is extended or adjusted under 35 U.S.C. 154(b) by 0 days.

(21) Appl. No.: 09/445,794

(22) PCT Filed: Jun. 12, 1998

(86) PCT No.: PCT/IL98/00271

§ 371 Date: Apr. 19, 2000

§ 102(e) Date: Apr. 19, 2000

(87) PCT Pub. No.: WO98/56735

PCT Pub. Date: Dec. 17, 1998

(30) Foreign Application Priority Data

Jun. 13, 1997 (IL) ............................................ 121073

(51) Int. Cl.⁷ .............................. A61K 9/14; A61K 9/48; A01N 25/00
(52) U.S. Cl. .................. 424/489; 424/486; 424/456; 424/452; 424/405; 424/408
(58) Field of Search .............................. 264/4.3; 71/64.07; 424/19, 426, 486, 489, 405, 409, 408, 451, 497, 452, 456, 457, 458

(56) References Cited

U.S. PATENT DOCUMENTS 4,601,863 * 7/1986 Shioi et al. ............................ 264/4.3

* cited by examiner

*Primary Examiner*—Thurman K. Page
*Assistant Examiner*—Blessing Fubara
(74) *Attorney, Agent, or Firm*—Martin Fleit

(57) ABSTRACT

Method for the production of encapsulated water-soluble granulated chemicals (fertilizers, salts, pesticides, etc.) with slow controlled release in water and soil with a uniform distribution of the chemicals in a melted thermoplastic, biodegradable and inert polymer composition, with subsequent formation of clots, granules or other shapes. The uniform cross-linked polymer compositions are produced by combining the process of polymerization of neutralized unsaturated carboxylic acids and the process of polycondensation of thiourea with formaldehyde, and the cross-linking of the obtained macromolecules with sulfur. Thus method makes it possible to obtain encapsulated chemicals with a wide range of use, containing up to 85% of the target product, with a gradual release which lasts for up to 180 and more days.

36 Claims, No Drawings

CONTROLLED RELEASE CHEMICALS

The present supposed invention belongs to the sphere of production of granulated water-soluble chemicals with slow controlled solubility and can be used in the chemical, petrochemical, biochemical and other industries as well as in agriculture with a view to increasing the effect of chemicals released into water or soil.

BACKGROUND

The intensive use of granulated water-soluble chemicals, such as fertilizers, micronutrients, pesticides and other plant-protection agents in agriculture, requires their rational use taking into account the specific needs of the plants. The unbalanced use of these chemicals observed at present brings about, besides extra economic cost, a reduction of the biological value of foodstuffs and feeds and creates the environmental contamination hazard.

The main cause behind all this is fast solution of the chemicals used and the consequent losses as well as, correspondingly, the application to the soil of excess quantities of such chemicals as compensation for the losses sustained.

An efficient way of increasing the effect of chemicals, in particular fertilizers and chemical plant-protection agents, with a view to increasing the productivity of crops and reducing losses and costs in connection with their application consists in regulated introduction of chemicals into the soil, i.e. the use of chemicals with slow, controlled, solubility.

Slow release of chemicals excludes the possibility of poisoning the plants in cases of overdose of chemicals and makes it possible to add simultaneously increased quantities of micro- and macronutrients calculated for long-term action.

Despite higher costs, the production of slow-solubility chemicals holds promising prospects due to the continuous increase of prices for conventional chemicals and the necessity to increase the effect of the target substances since they are the determining factor as far as uniform application of chemicals to the soil and their capability of ion-exchange reactions with the soil components are concerned.

The known production methods of slow-solubility chemicals may be conditionally divided into those chemical and those physical, based on the nature of the solubility reduction rate.

In the case of substances based on the chemical slow-down of solubility (e.g., fertilizers, sintered ferrites, hardly soluble salts, ion-exchange media, urea formaldehyde, isobutylen urea, oxamide, and others) what is actually changed is either the mechanism of the nutrients' transition to an assimilable form or their form as such.

However, despite the wide variety of forms (oxides, salts, complexonites, ionites) and a broad spectrum of initial raw materials (from reactive compounds to industrial wastes), the chemical methods are unable to ensure arbitrary regulation of the chemicals' solution rate over a wide scale.

The physical methods of slowing down solubility are preferable since, due to a change in structure, they influence the kinetics without modifying the chemical composition of the chemicals and of assimilable forms of fertilizers.

Among physically modified compositions, the most widespread are multilayer granules whose solubility rate is determined by the thickness and composition of the outer coating film. As often as not, coatings made of various polymers, elementary sulfur, drying oils, resins, etc. are used to produce such films.

Another type of film of this kind is represented by a water-insoluble powder of non-organic origin which forms as a result of the hardening of liquid film on the surface of granules, or due to the lamination on their surface of finely dispersed powder. The most frequently used coatings are made of sulfur, phosphogypsum, sinters, dolomite, phosphorite meal, and magnesite.

The solubility reduction may also be achieved by compacting powders using both mechanical and thermal methods. These methods are used to produce slowly soluble chemicals of various geometrical forms: balls, cylinders, round tablets, and other briquettes. Various methods are used for the production of such chemicals of which the most important are compaction, extrusion, and crystallization of oversaturated fusion solutions in special moulds.

The common drawback of these methods consists in the difficulty of maintaining the admissible temperature of the mixture without local overheating and fluidity reduction. Additional difficulties may be encountered in the course of the extrusion process while cooling and cutting the braid; difficulties may also arise due to the working spinnerets wear.

The feasibility of using various coatings and methods of their application is almost totally determined by their production cost, i.e. by the cost of materials and additional technological operations.

The common drawback of known slow-solubility chemicals is their high cost, which is substantially higher than that of conventional chemicals. This is due to high energy requirements in compacting and sintering, the reduction of equipment reliability because of adhesion in the process of film-formation, and the use of expensive reagents in the complexing and ion-exchange processes. As a consequence, the known methods of slowing down the solubility of chemicals require improvements aimed mainly at increasing their effectiveness and reducing costs.

Among physical methods of the modification of chemicals, the technology based on the encapsulation of granulated water-soluble chemicals using water-resistant thermoplastic matrices of various nature is the one more rarely used due to the insufficient effectiveness of known materials and the high cost of polymer products synthesized for the purpose.

The present invention relates to methods of physical modification of granular chemicals and to their products. The method of reducing the solubility of chemicals is discussed and evaluated here in more detail.

PRIOR ART REFERENCES

There is an abundance of articles, patents and reviews devoted to physical methods of reducing the solubility of granulated water-soluble chemicals, in particular fertilizers and chemical plant protection agents.

There are detailed descriptions of methods based on the selection or purposeful synthesis of materials that can be used for coatings. Thus, polymer coatings based on polyolefins, such as polyethylene, polypropylene, and copolymers of ethylene and carbon oxide, have been recommended. (U.S. Pat. No. 4,019,890; U.S. Pat. No. 5,264,019, W09503260 A1950202). The introduction of polyolefin vinyl acetate into the polymer chain makes it possible to regulate the moisture permeability of the protective coating within a wide range (U.S. Pat. No. 4,369,055). The use of epoxy-polyester resin (U.S. Pat. No. 3,259,482), polyurethane (U.S. Pat. No. 3,264,089), and polystyrene (U.S. Pat. No. 3,158,462) for protective coating has also been described.

Beside the high cost of these polymers, a substantial drawback is their stability in soil for a long time, which results in soil contamination and limits their practical use.

With a view to obtaining fertilizers in a slow-release form, coatings based on salts of non-saturated carbon acids (U.S.

Pat. No. 4,936,897) or their glycerides (U.S. Pat. No. 4,880,455), dicyclopentadien in combination with flaxseed or soyabean oil (U.S. Pat. No. 4,657,576), polyvinylidene chloride and other latexes (U.S. Pat. Nos. 5,089,041; 5,186,732; 5,395,449; 5,399,186), and polymers with neutralized sulfonate groups (U.S. Pat. Nos. 5,413,856; 5,429,654; 5,435,821) have been recommended. The drawbacks of such coatings, however, consist in the difficulties of their application and their comparatively low efficiency.

Another physical method of reducing the solubility of granulated water-soluble chemicals consists in their even distribution in a mass of water-resistant thermoplastic material with the consequent formation of clots or granules of desired size.

In particular, wax (U.S. Pat. No. 3,929,446) or paraffin (U.S. Pat. No. 4,047,922) have been recommended as matrix material for the encapsulation of nitrogen fertilizers. The obvious drawback of such matrices based on wax or paraffin is the low mechanical strength of the product and its susceptibility to clumping.

Polymer matrices on the basis of polystyrene derivatives have been proposed for the encapsulation of water-soluble chemicals (E.P. 0198520, U.S. Pat. No. 4,435,383) as well as a copolymer based on unsaturated monomer dicarboxylic acid (U.S. Pat. 4,557,929). Solid polysiloxane containing hydroxyl groups has also been recommended for the same purpose (U.S. Pat. Nos. 4,172,904; 4,205,096; 4,352,833) as well as polysiloxane in combination with a carbinol-containing polymer (U.S. Pat. Nos. 4,282,207; 4,282,208; 4,283,387).

Urea-formaldehyde resin compositions (U.S. Pat. Nos. 4,252,785; 5,102,440) and crystalline polymers with side chains (U.S. Pat. No. 5,120,349) can be used as polymer matrix for the encapsulation of fertilizers and other water-soluble chemicals. Plastic NWR-polymers mixed with previously milled fertilizers have been proposed as a biodegradable matrix for obtaining granulated fertilizers of long-term effect (EP 0639545, A1950222).

The use of these polymer matrices is only justified for the encapsulation of expensive chemicals and is not economically feasible for the encapsulation of cheap granulated materials such as fertilizers.

The above data indicate the existence of considerable interest for physical methods of producing chemicals in slow-release form which make it possible to regulate the target product release rate. In connection with the tightening requirements towards chemicals to be used in agriculture and other spheres from the point of view of their ecological safety, increased interest for slow-solubility chemicals should be expected since their use minimizes release to the environment.

Economic feasibility of their use remains an important condition in this respect as well as the elimination of possible soil and water basins contamination from products used in the encapsulation process.

SUMMARY OF THE INVENTION

The present invention relates to a physical method of production of granulated water-soluble chemicals with a slow, controlled solubility rate and to the products thus obtained.

Another object of the invention is the thermoplastic biodegradable inert composition which is used for the encapsulation of granulated water-soluble chemicals.

The present invention provides a method ensuring long-term controlled release of encapsulated granulated water-soluble chemicals into water or soil by homogeneous distribution of these chemicals in a melted polymer composition with the consequent formation of clots or granules of the required size. The release time of the encapsulated chemicals is regulated by the physicochemical properties of the polymer composition and depends on the properties and concentration of the encapsulated chemicals, the sizes and forms of clots or granules, the existence of the superficial coating made of inert materials (talc, wax, paraffin, drying oils, etc.); it also depends, to a small extent, on the environmental conditions (types of soil, pH, etc.).

The invention also includes the production method of the polymer composition which consists in carrying out combined processes of polymerization of neutralized tallow oil acids and polycondensation of thiourea and formaldehyde, cross-linking the obtained macromolecules with sulfur, thus producing a homogeneous cross-linked polymer composition.

The production of the said polymer composition is realized by heating the ingredients in the presence of neutralizing agents and additives which ensure the desired properties of the polymer composition making it possible to encapsulate granulated water-soluble chemicals.

The polymer composition synthesis is a single-stage, no-waste process realized without solvents.

The production of encapsulated granulated water-soluble chemicals with slow and controlled solubility is achieved by mixing the chemicals with the polymer composition at an elevated temperature, preferably a temperature of 85–140° C., with subsequent moulding to obtain clots or granules using standard equipment utilized in the polymer materials production (mixer, extruder, granulator, etc.).

The polymer composition may be used for the encapsulation of a wide spectrum of granulated water-soluble chemicals, such as fertilizers, micronutrients, pesticides and other biologically active substances, as well as their various combinations. The polymer composition is inert, harmless for plants and man, decomposes in the soil and does not contaminate the environment.

DESCRIPTION OF THE PREFERRED EMBODIMENTS

The production of the polymer composition is effected by interaction of the following comonomers: tallow oil and/or oleic and linoleic acids, thiourea and formaldehyde and/or paraformaldehyde. Tallow oil, and/or oleic and linoleic acids used as comonomers may be employed as such or may be previously oxidized by atmospheric oxygen or processed with sulfur in the course of heating by known methods. The modification of the said comonomers in this way improves the mechanical properties of the polymer composition. These comonomers may be loaded simultaneously or step by step.

The chemical interaction of the said comonomers is carried out in the presence of neutralizing agents selected from among oxides, hydroxides or carbonates of calcium, magnesium, aluminium and zinc, as well as additives increasing the hydrolytic stability of the polymer complex and acting as plasticizer. The following amine compounds may be used as additives: 8-oxichinoline, triethynolamine, melamine and diphenylamine; they may be used individually or in various combinations.

Dibutyl phthalate, diethyleneglycol, glycerin, liquid paraffin and the like may be used as additional plasticizers; they are either added at the stage of synthesis or introduced into the ready melt of the polymer composition.

The homogeneous cross-linked structure of the polymer composition is attained in the presence of cross-linking agent such as elementary sulfur or sulfides or polysulfides of alkali metals, both individually or in combination.

The following date are illustrative only.

The quantity of tallow oil and/or oleic and linoleic acids in the initial charge is 65–75 vol. % (preferably 70–72 vol. %) in the presence of the neutralizing agent in the quantity of 0.7–1.1 mole per 1 mole of carboxylic acid (preferably 0.9–1.0 mole/mole). Formaldehyde in the form of a water solution or paraformaldehyde and thiourea are added to the initial charge in the quantity of 1.5–3.0% each (preferably 2.0–2.4%). The formaldehyde/thiourea mole ratio is 1.5–5.0 (preferably 2.0–3.0). The quantity of amine compounds added is 1.0–5.0% (preferably 2.0–3.0%). When additional plasticizer is used, its quantity amounts to half of that of the amine compound. The cross-linking agent (sulfur and/or sulfide compound) is added in the quantity of 3.0–5.0% (preferably 3.5–4.0%). Increasing the quantity of the cross-linking agent to over 5.0% results in lower elasticity of the polymer composition and in the worsening of its quality.

The process of the polymer composition synthesis preferably occurs at temperatures of 110–150° C. and reaches completion in the course of 15–30 minutes.

The polymer composition obtained in accordance with the present invention is a viscous mass congealing at room temperature into a resin-like product of yellow to brown color. The initial softening temperature of the polymer matrix depends on the conditions of its synthesis and is about to 80–120° C. while the decomposition temperature is about 180–200° C. The polymer composition density at 20° C. is 1100–1150 Kg/m$^3$, its viscosity at 130° C. is 100–130 Ps (Brookfield D.V.-1 viscosimeter). The polymer composition does not swell and does not dissolve in water, acetone or ethanol, but is soluble in benzene, tetrachlorocarbon and aliphatic hydrocarbons.

The polymer composition is not harmful for plants which is confirmed by experimental data shown in Table 1.

The polymer composition formed in accordance with the present invention is a homogeneous cross-linked product produced as a result of the combined processes of polymerization of neutralized unsaturated carboxylic acids:

composition are linked by sulfide bridges. The average element contents of the polymer composition is as follows (vol. %): C=63.5; H=9.3; N=1.6; S=3.9.

TABLE 1

Experiment with Polymer Composition:

| | 500 g of Hamra soil only with the addition of 3 g powder of polymer composition | 5 "pots" of 140 g treated soil with 10 seeds of wheat 1–5 +17 g water % germination | 5 control "pots" without powder | keeping wetness by weighing every 2 days |
|---|---|---|---|---|
| | 2 days % | 3 days % | 5 days % | 7 days % |
| 1 | 30 | 80 | 80 | 90 |
| 2 | 40 | 90 | 90 | 90 |
| 3 | 20 | 80 | 80 | 90 |
| 4 | 40 | 100 | 100 | 100 |
| 5 | 10 | 100 | 100 | 100 |
| 0 | 30 | 80 | 90 | 90 |
| 0 | 20 | 90 | 90 | 90 |
| 0 | 20 | 90 | 100 | 100 |
| 0 | 40 | 90 | 90 | 90 |
| 0 | 30 | 100 | 100 | 100 |
| Averages: | | | | |
| treatment | 28 | 90 | 90 | 94 |
| standard | 12 | 9 | 9 | 5 |
| control | 28 | 90 | 94 | 94 |
| standard | 7 | 6 | 5 | 5 |

The reported method of producing the polymer composition in its general form is implemented as follows:

The reaction vessel is loaded with tallow oil and/or oleic and linoleic acids, after which the neutralizing agent, formaldehyde in the form of aqueous water solution or paraformaldehyde, thiourea, the amine compound, the additional placticizer and the cross-linking agent are added at the (Fragment A)

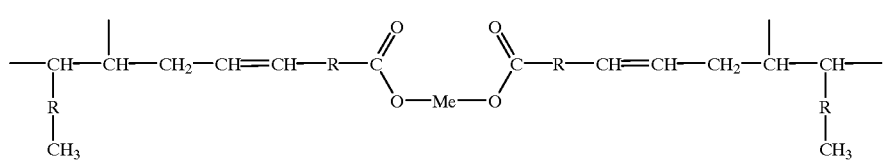

where R is $C_n H_{2n}$, Me is metal
and of polycondensation between thiourea and formaldehyde required temperature and with continuous mixing. After mixing the reactor mixture for the required time, the melt of (Fragment B)

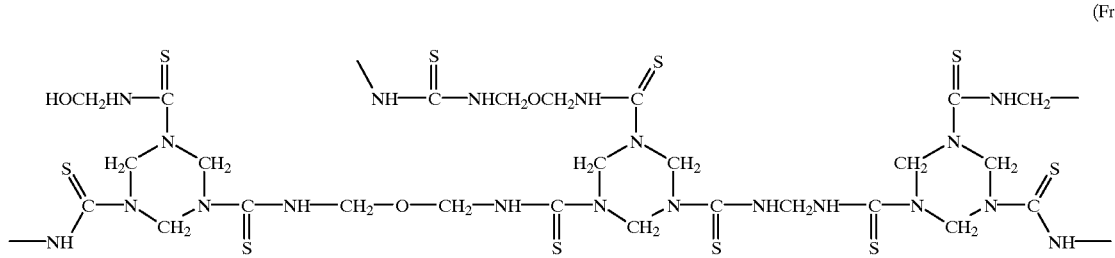

In this process, the polymerization (90–94 mass %) and polycondensation (3–6 mass %) components of the polymer the obtained polymer composition is unloaded; in the process of cooling, it congelates into a resin-like mass.

In the framework of the present invention, the encapsulation method of water-soluble granulated chemicals using synthesized polymer composition includes the following stages:

milling the chemical to be encapsulated to obtain particles of a size about 150 µm and not over 850 µm depending on the nature of the chemical;

mixing the milled granulated chemical with the polymer composition melt;

crushing the obtained mixture of the chemical and the polymer composition to obtain particles of the size of 6–10 mm;

moulding the crushed mixture to produce a braid with the subsequent formation of clots or granules of the required size.

Standard equipment used for the production of plastic products is employed in each of the said stages (mills, mixers, crushers, extruders, granulators). The technological process involved in this version of the method is periodic in its nature and is implemented in the following way.

The granulated water-soluble chemical is milled, as necessary, to obtain particles of the desired size in a mill of appropriate design and is fed into the mixer, preferably equipped with Z-form mixing blades, where it is mixed with the melt of the polymer composition. The temperature and duration of this stage are determined by the specific properties of the ingredients and, as a rule, are not above 140° C. and 20 minutes, respectively.

The mixture obtained in this way is unloaded from the mixer while still hot and placed into a receiving collector from where, after congelation, it is fed into a crusher to obtain particles of the size meeting the requirements of the equipment used at the moulding stage; the latter can be, for example, a single- or double-screw extruder, preferably equipped with a degassing zone and a cutting device to cut the product into granules.

In accordance with another version, the process equipment makes it possible to effect the encapsulation of the corresponding chemical using continuous technology (which is preferable from the point of view of the stability of the final product's properties), to eliminate a number of stages, and increase the economic results by reducing the energy-intensity of production and (he numbers of the required personnel.

This version involves the use of a single- or double-screw homogenizing extruder which allows to achieve high-quality mixing in a continuous process. The material is continuously fed from the first mixing extruder into the second extruder equipped with a spinneret head; then the material is fed into a strand granulator. The initial chemical to be encapsulated and the polymer composition melt are fed directly to the homogenizing extruder through the corresponding feeders. Thus, the crushing stage and two stages of intermediate products transfer, which were necessary in the first version, are eliminated, and the process becomes continuous.

One more version comprises the encapsulaton of granular water-soluble chemicals according to a simplified scheme, without the production of granules of pre-defined forms and sizes. For this purpose, the mixture of the chemicals with the melt of the polymer composition is unloaded from the mixer by a screw or is squeezed out by compressed air and afterwards is milled into clots by known methods. This substantially simplifies the technology and makes it cheaper.

The proposed polymer composition allows the encapsulation of a wide spectrum of granular water-soluble chemicals, such as fertilizers, micronutrients, pesticides, and other biologically active substances, both individually and in various combinations, provided they maintain their stability at temperatures over 80° C. The polymer composition/encapsulated chemical ratio generally amounts to about 15–35/65–85.

The novel method makes it possible to obtain encapsulated granular chemicals in various geometrical forms of any diameter. Preferably, they are clots and granules of 1.5 mm to 15.0 mm diameter.

The effectiveness of the encapsulation using the polymer composition is a function of the granulometric contents of the encapsulated chemical, its volume concentration, the form of crystals, and the homogenization degree of the mixture.

The physical notions on the structure of chemicals encapsulated using the proposed polymer composition and their functioning in the course of the target product release process consist in the following:

the existing homogeneous system containing 65%–85% of the encapsulated chemical is made of filiform and clot-like aggregates of the polymer composition material embedded in the compact mass of the encapsulated chemical;

the simplest and most effective technological form of granules is that of a sphere and a cylinder whose length is equal to its diameter;

the release of the encapsulated product is effected mainly by way of mass transfer from the hard core of the granule containing the non-dissolved granular chemical to the outside, through the porous structure containing the dissolved chemical;

the content of the granulated chemical in solution within the granule reaches 10% of the initial content of the chemical in the granule. The maximum content is reached in the middle of the release process;

under the conditions of variable humidity which is characteristic of the encapsulated chemicals use in the soil, the release of the target product occurs, together with the mass transfer, by way of moisture exchange of the granule with the environment;

the size structure of the encapsulated chemical is modified because of swelling in the course of the release. The swelling finds expression in the increase of the size of cells in the porous structure where the granulated chemical is substituted by its solution in the course of the release process; the outside size of the swelled granule increases and the release rate grows;

the dynamics of release of the target product from the encapsulated spheres and cylinders is reflected by a characteristic convex curve testifying to the reduction of the release rate with time.

The method of encapsulaton of granular water-soluble chemicals according to the present invention makes it possible to control the target product release dynamics. It can be achieved both by changing the polymer composition's properties (elasticity, hydrolytic stability, etc.) through a modification of the conditions of its synthesis, or by changing the size of the granules and coating them with inert materials (paraffin, wax, drying oils, etc.). It is desirable that the resistance of such coatings be commensurate with that of the porous structure with a view to achieving greater linearity of the integral target product release curve.

The quality of the granular water-soluble chemicals encapsulated using the polymer composition can be evaluated by the target product release rate in water or in periodically watered soil.

The advantages of the novel solutions in the frameworks of the present invention consist in the simplicity and economic efficiency of the technological realization of the process: the absence of cumbersome, expensive and energy-intensive equipment and the use of readily available and cheap raw materials for the production of the polymer composition. The target products output at all stages of the proposed technology is practically quantitative. No by-products and wastes are formed in the polymer composition production process and no solvents are used. The synthesis of the polymer composition whose contents may be varied within a wide range is achieved at comparatively low temperatures (up to 150° C.).

Another advantage of this method consists in the universal character of the polymer composition used. It may be used for the encapsulation of a broad spectrum of granular water-soluble chemicals including such widely used fertilizers as urea, nitrates, potassium salts, phosphates, as well as various micronutrients-containing compounds. Combined encapsulation with a view to obtaining complex fertilizers such as N.P.K. is also possible. The polymer composition is also effective for the encapsulation of water-soluble pesticides (fungicides, herbicides, insecticides, acaricides, growth regulators, etc.) as well as other biologically active substances.

Another substantial advantage of the method is the possibility of producing encapsulated chemicals containing up to 85% of the target product whose monotonous release lasts for up to 180 days and more. In the course of the release process, the polymer composition used is not accumulated in the soil but is biologically destroyed. The polymer matrix material is non-toxic and exerts no harmful influence on the vital activity of animals and plants.

Still another advantage of the novel method is the possibility of control over the target product release dynamics using various techniques such as changing the concentration and the granulometric composition of the granulated chemical, modifying the properties of the polymer composition and the geometrical forms and sizes of clots or granules, or the use of a water-permeable protective coating. The existence of local defects in the coating does not lead to a loss of efficiency. The technological process of application of the coating is of minor importance and, therefore, sufficiently simple.

An advantage of the method also consists in the possibility of gradual and uniform release of the target product at a rate ensuring its optimal concentration in the soil, thus achieving the maximum target use of the chemical. This eliminates any possible damage to the plants inherent in the use of excess quantities of chemicals and minimizes the contamination of the environment.

Another advantage of the novel method is the fact that possible local defects of the porous structure in using the said polymer composition do not influence the target product release process as sharply as the minimal local defects of the coatings do since they serve as the only protective barrier.

Still another advantage of the novel process is the fact that the encapsulation of the novel polymer composition is well compatible with other methods of protecting granulated chemicals from rapid dissolution, in particular, with that of using protective coatings. The individual derits of each of the corebined methods remain, however, intact.

All the foregoing advantages of the present invention show that the use of the polymer composition developed for slowing down the solubility of granular chemicals is an economically expedient and promising method of their encapsulation.

The invention is illustrated below by way of example by the following concrete production examples.

EXAMPLE 1
Synthesis of Polymer Composition

The polymer composition synthesis is carried out in a glass reactor of 1 liter capacity equipped with a jacket for the heat-transfer medium and a cock for the discharge of the ready product. The reactor is also equipped with a bladed mixer with regulatable rotation speed. The detachable cap of the reactor has inlet connections for loading the initial ingredients, mounting a control thermometer and coupling a refrigerator to ensure the condensation of vapors. The required temperature in the reaction zone is ensured by feeding into the reactor jacket the heat-transfer medium: such as silicone oil from a circulating thermostat.

The following ingredients are loaded into the reactor described above: tallow oil, 455.0 g (1.54 mole); then, in the course of continuous mixing, the following is loaded successively: calcium oxide, 25.8 g (0.46 mole); zinc carbonate, 77.7 g (0.62 mole); formaldehyde as 38% water solution, 55.3 g (0.70 mole); thiourea, 10.5 g (0.14 mole); 8-oxichinoline, 14.0 g (0.096 mole): triethanolamine, 21.0 g (0.14 mole); dibuthyl phthalate, 17.5 g (0.062 mole); and elementary sulfur, 21.0 g (0.65 mole).

After all the ingredients are loaded, the heat-transfer medium is heated to 120° C. and fed to the reactor jacket. The mixing continues for 20 minutes; as a result, 616.7 g of polymer composition is obtained which is poured out into the receiving collector.

The product obtained is a resin-like mass of yellow color with an initial softening temperature of 80° C. and a viscosity of about 110 Ps at 120° C.

EXAMPLE 2
Synthesis or Polymer Composition

The reactor described in Example 1 is loaded with 385.0 g (1.30 mole) of tallow oil and 140.0 g (0.49 mole) of oleic acid; after starting the mixer, 57.6 g (1.43 mole) of magnesium oxide and 42.1 g (0.54 mole) of aluminium hydroxide are added. Then the feeder for the heat-transfer medium is heated to 150° C. is opened. Five minutes later, in the course of continuous mixing and heating the reactive mass, the following ingredients are added as fast as possible: paraformaldehyde, 15.7 g (0.52 mole); thiourea, 26.4 g (0.35 mole); melamine, 5.6 g (0.044 mole); diphenylaimine, 1.4 g (0.008 mole); ethyleneglycole, 3.5 g (0.056 mole); sulfur, powdered, 21.0 g (0.65 mole); and potassium sulfide, 14.0 g (0.013 mole); the heating continues for another 10 minutes after which 616.7 g of the obtained polymer composition is poured out into the collector.

The product obtained is a resin-like mass of yellow color with an initial softening temperature of 100° C. and a viscosity of about 130 Ps at 130° C.

EXAMPLE 3
Synthesis of Polymer Composition

A reactor similar to that described in Example 1 is loaded with 497.0 g (1.68 mole) of tallow oil. Starting the mixer and opening the feeder for the heat-transfer medium heated to 140° C., the oxidization of the tallow oil begins and continues for 20–30 min. After that, the following ingredients are added successively: magnesium hydroxide, 19.6 g (0.34 mole); zinc oxide, 82.2 g (1.01 mole); paraformaldehyde, 10.5 g (0.35 mole); thiourea, 10.6 g (0.14 mole); triethanolamine, 13.3 g (0.089 mole); melamine, 4.2 g (0.033 mole); glycerin, 1.4 g (0.015 mole); liquid paraffin, 7.0 g (0.035 mole); sulfur, powdered, 19.6 g (0.61 mole); and sodium polysulfide, 7.0 g (0.041 mole). The mixing continues at 140° C. for 15 min. after which 622.0 g of the obtained polymer composition is poured into the collector.

The product obtained is a resin-like mass of brown color with an initial softening temperature of 110° C. and a viscosity of about 130 Ps at 130° C.

EXAMPLE 4
Synthesis of Polymer Composition

A reactor as described in Example 1 is loaded with 390.0 g (1.32 mole) of tallow oil and 100.0 g (0.36 mole) of linoleic acid: after starting the mixer, 10.0 g (0.31 mole) of powdered sulfur is added. Then the feeder for the heat-transfer medium heated to 110° C. is opened and the sulfurization of the unsaturated carboxylic acids continues for 15 min. Then, while the mixing continues, the following ingredients are loaded successively: magnesium hydroxide, 97.9 g (1.68 mole); formaldehyde as 38% water solution, 44.2 g (0.56 mole); thiourea, 15.4 g (0.20 mole); 8-oxychinoline, 21.0 g (0.14 mole); diethyleneglycole, 10.5 g (0.099 mole); and sulfur, powdered, 18.0 g (0.56 mole).

After all ingredients are loaded, the mixing of the reactive mass continues for 30 minutes at 110° C.; as a result, 620.2 g of polymer composition is obtained which is poured out into the receiving collector.

The product obtained is a resin-like mass of brown color with an initial softening temperature of 120° C. and a viscosity of about 125 Ps at 130° C.

EXAMPLE 5
Synthesis of Polymer Composition

A reactor as described in Example 1 is loaded with 498.0 g (1.69 mole) of tallow oil and, while mixing continues, the following ingredients are loaded successively: zinc hydroxide, 160.0 g (1.61 mole); paraformaldehyde, 15.4 g (0.51 mole); thiourea, 12.9 g (0.17 mole); triethanolamine, 17.5 g (0.12 mole); and sulfur, powdered, 24.5 g (0.76 mole). After all ingredients are loaded, the feeder for the heat-transfer medium heated to 130° C. is opened.

The mixing continues for 20 min. after which 676.9 g of polymer composition is obtained which is poured out into the receiving collector.

The product obtained is resin-like mass of light yellow color with an initial softening temperature of 95° C. and a viscosity of about 120 Ps at 130° C.

EXAMPLE 6
Encapsulation of Potassium Chloride

A mixer of 4 liters capacity equipped with two Z-form mixing blades and a jacket for holding the heat-transfer medium is loaded with 225.0 g of polymer composition produced according to Example 4 and 1275.0 g of potassium chloride with a particles size of 150–425 $\mu$m. The ingredients are mixed for 15 min. at a temperature of 140° C.

After congelation of the obtained homogenous mixture containing 15% of the polymer composition and 85% of potassium chloride, it is crushed in the crusher to obtain particles not greater than 6 mm in diameter which are fed into a single-screw extruder (the screw diameter is 32 mm, the screw length/diameter ratio is 19; the extruder has three heating zones and one degassing zone). In the course of extrusion of the mixture, a temperature of 30° to 90° C. is maintained in the zones. The obtained braids of 5.0 mm diameter are fed into a strand granulator where granules of the required size are produced by the cutting device; then the granules are powdered with talc.

5.0 g of the granules thus obtained are placed in a covered cup containing 50.0 ml of distilled water. In the course of 10 days, 17.3% of the encapsulated potassium chloride is released. The release of 80% of potassium chloride occurs in the course of 87 days (2.9 months).

5.0 g of granules pre-coated with a superficial paraffin layer (2.5% of the granules by weight) have been tested in a similar manner. In the course of 10 days, 5.7% of the encapsulated potassium chloride was released. The release of 80% of potassium chloride occurred in the course of 105 days (3.5 months).

EXAMPLE 7
Encapsulation of Urea

Mixing 450.0 g of polymer composition obtained in accordance with Example 5 and 1050 g of crystalline urea produced by H.Y. Baker and Bro company (USA) with a particle size of 250–850 $\mu$m in the course of 20 min. at 110° C. in a measure similar to Example 6, their mixture is obtained and, after crushing and extrusion of the mixture, granules of 3.5 mm diameter containing 70% of urea and 30% of polymer composition are moulded. The granules are then powdered with talc.

The urea release rate from the said granules in water amounts to 15.9% in the course of 10 days. The release of 80% of the urea occurs in the course of 185 days (6.1 months).

Granules previously coated with a layer of wax containing 10% boiled oil (3.0% of the granules by weight) were tested in a similar way. The results of the test which was carried out at 25° C. are shown in Table 2.

TABLE 2

| | Quantity of Urea Released, % | | | | |
|---|---|---|---|---|---|
| Hour | Urea released (% of initial) | Hours (months) | Urea released (% of initial) | Hours (months) | Urea released (% of initial) |
| 8 | 1.3 | 576 | 24.3 | 2688 (3.7) | 62.1 |
| 24 | 1.7 | 840 (1.2) | 32.1 | 3024 (4.2) | 63.9 |
| 48 | 2.3 | 1008 (1.4) | 40.4 | 3360 (4.7) | 65.1 |
| 72 | 3.0 | 1344 (1.9) | 49.3 | 3696 (5.1) | 68.4 |
| 96 | 3.6 | 1680 (2.3) | 53.7 | 4032 (5.6) | 71.4 |
| 168 | 7.9 | 1896 (2.6) | 55.9 | 4368 (6.1) | 75.7 |
| 240 | 11.6 | 2016 (2.8) | 57.3 | 4704 (6.5) | 78.8 |
| 408 | 18.2 | 2184 (3.0) | 59.1 | 5040 (7.0) | 82.3 |
| | | 2352 (3.3) | 61.5 | | |

EXAMPLE 8
Encapsulation of Potassium Nitrate

Adhering to the conditions of Example 6, 375 g of polymer composition obtained in the same manner as in Example 1 and 1125 g of potassium nitrate with a particles size of 150–600 $\mu$m are mixed at 120° C. to obtain a mixture which, after crushing and extrusion, produces granules of 15 mm diameter containing 75% of potassium nitrate and 25% of polymer composition. The granules are then powdered with bentonite.

The potassium nitrate release rate from the said granules in water a mounted to 7.6% in the course of 10 days. The release of 80% of the potassium nitrate occurred in the course of 290 days (9.6 months).

Granules previously coated with a layer of boiled oil were tested in a similar way; the coating contained 30% of polymer composition dissolved in it while heating according to Example 1. The coating amounted to 1.5% of the granules by weight. The release of 2.7% of encapsulated potassium nitrate occurred during the course of 10 days. The release of 80% of potassium nitrate occurred during the course of 345 days (11.3 months).

EXAMPLE 9
Encapsulation of a Mixture of Salts of Micronutrient Elements

According to Example 6, 525 g of polymer composition obtained according to Example 3 and 975 g of a mixture of micronutrient fertilizers of the ANMOL MICRO type produced by Dayal Fertilizers (P) (India) containing Zn 6.0%, Fe 3.0%, Cu 0.5%, Mn 1.0%, Mg, S—q.s. are mixed in the course of 10 min. at 115° C. The mixture thus produced is crushed and extruded to obtain granules of 1.5 mm diameter containing 65% of the micronutrient fertilizers and 35% of polymer composition. The granules are then powdered with dolomite.

The micronutrient fertilizers release from the said granules in water amounted to 17.5% in the course of 10 days. The release of 80% of micronutrient fertilizers occurred in the course of 95 days (3.2 months).

Granules previously coated with a layer of wax (3.0% of the granules by weight) were tested in a similar way. The encapsulated salts release from the said granules amounted to 14.4% in the course of 10 days. The release of 80% of the encapsulated salts required 112 days (3.7 months).

EXAMPLE 10
Encapsulation of Monoammonium Sulfate

Under the conditions of Example 6,450 g of a polymer composition obtained in accordance with Example 5 and 1050 g of monoammonium sulfate of particle size of 150–425 μm are mixed at 105° C. and, after crushing and extrusion of the mixture produced, granules of 4.5 mm diameter containing 70% of monoammonium sulfate and 30% of polymer composition are obtained. The granules are then powdered with dolomite.

The monoammonium sulfate release from the said granules in water amounted to 18.6% in the course of 10 days. The release of 80% of monoammonium sulfate required 93 days (3.1 months).

Granules previously coated with a layer of boiled oil (2.0% of the granules by weight) were tested in a similar way. The monoammonium sulfate release from the said granules amounted to 15.2% in the course of 10 days. The release of 80% of monoammonium sulfate required 102 days (3.4 months).

EXAMPLE 11
Encapsulation of N.P.K. Fertilizer

Under the conditions of Example 6,375 g of polymer composition obtained in accordance with Example 3 and 1125 g of combined N.P.K. fertilizer (27-3-6) produced by the Keshet Prima Israel Ltd. firm with a particle size of 150–600 μm are mixed at 120° C. and, after crushing and extrusion of the mixture produced, granules of 3.0 mm diameter containing 75% of N.P.K. fertilizer and 25% of polymer composition are obtained. The granules are then powdered with talc.

The release of the combined fertilizer components in the course of 10 days amounted to: N 16.8%; $P_2O_5$ 20.7%; $K_2O$ 18.1%. The release of 80% of each of the said components required: N 100 days (3.3 months); $P_2O_5$ 87 days (2.9 months); $K_2O$ 114 days (3.8 months).

Granules previously coated with a layer of paraffin (3.0% of the granules by weight) were tested in a similar way. The release of each of the components in 10 days amounted to: N 12.6%: $P_2O_5$ 17.9%; $K_2O$ 14.3%. The release of each of the components required: N 117 days (3.9 months); $P_2O_5$ 99 days (3.3 months); $K_2O$ 123 days (4.1 months).

EXAMPLE 12
Encapsulation of N.P.K. Fertilizer

Under the conditions of Example 6,450 g of polymer composition obtained according to Example 1 and 1050 g of combined fertilizer (12-8-10) with particles sized 150–600 μm produced by the Biwang Industrial Ltd. firm (South Korea) of the following composition (mass %): Zeolite, 20.51; KCl, 0.79; diammonium phosphate, 17.60; borax, 0.68 and sludge from sugar company, 60.42 (N 14.5%; $K_2O$ 15.5%) are mixed at 115° C. in the course of 15 min. After the obtained mixture is crushed and extruded, granules of 4.0 mm diameter containing 70% of N.P.K. fertilizer and 30% of polymer composition are produced and powdered with talc.

The release of each of the components in 10 days amounted to: N 14.4%; $P_2O_5$ 16.5%; $K_2O$ 16.7%. The release of 80% of each of the components required: N 111 days (3.7 months); $P_2O_5$ 93 days (3.1 months); $K_2O$ 117 days (3.9 months).

Granules coated with a layer of a 30% solution of polymer composition obtained while heating as stated in Example 1 were tested in a similar way. The coating was 2.5% of the granules by weight. The release of the components in 10 days amounted to: N 11.6%; $P_2O_5$ 12.4%; $K_2O$ 12.2%. The release of 80% of each of the components required: N 126 days (4.2 months); $P_2O_5$ 105 days (3.5 months); $K_2O$ 130 days (4.3 months).

EXAMPLE 13

A sample of encapsulated urea in granules (65% urea and 35% polymer composition, as in Example 5) according to the conditions of Example 6 and containing 1.2 g of nitrogen is introduced into sandy soil containing KCl and $KH_2PO_4$ (on the base of 1.5 g phosphorus and 5.2 g potassium) and 40 grains. The granules are coated with a layer of boiled oil (2% of the granules by weight) in which 30% of polymer composition is dissolved.

Data on the urea release dynamics obtained under the conditions of variable moisture and environmental temperature obtained in the Laboratory for the Environmental Systems Management (Israel Institute of Technion, Prof. Yoram Avnimelech) are shown in Table 3.

TABLE 3

| Urea Released, % | |
|---|---|
| Hours | Urea released (% of initial) |
| 96 | 3.1 |
| 264 | 4.7 |
| 432 | 6.7 |
| 600 | 7.6 |
| 768 | 11.4 |
| 936 | 13.5 |
| 1272 | 15.1 |
| 1440 | 16.8 |
| 1608 | 17.6 |

EXAMPLE 14

Under the conditions of Example 13, but with the difference that only granules of encapsulated urea were placed in sandy soil, urea release was determined under the conditions of constant moisture at 30° C. The data on the urea release in soil are shown in Table 4.

TABLE 4

| Urea Released, % | |
|---|---|
| Hours | Urea released (% of initial) |
| 72 | 1.5 |
| 168 | 4.5 |
| 240 | 8.0 |
| 336 | 10.5 |
| 408 | 12.0 |
| 504 | 15.0 |
| 696 | 18.0 |
| 864 | 19.5 |

EXAMPLE 15

Under conditions similar to those of Example 14, the release of potassium chloride from granules (70% of potassium chloride and 30% of polymer composition) coated with a layer of wax containing 10% boiled oil (3.0% of the granules by weight) was determined.

The potassium chloride release during 45 days amounted to 3.6%.

EXAMPLE 16

Encapsulation of Insecticide Acephate (N-[methoxy (methylthio)phosphinol]acetamide)

Under the conditions of Example 6, 450 g of polymer composition obtained in accordance with Example 1 and 1050 g of the insecticide Acephate (N-[methoxy(methylthio) phosphinol]acetamide) produced by Dhanuka Pesticides Ltd. firm (India) are mixed at 85° C. in the course of 10 min. After crushing and the extrusion of the mixture produced, granules of 3.5 mm diameter containing 70% of Acephiate and 30% of polymer composition are obtained. The granules are then powdered with talc. The Acephate release from the said granules in water amounted to 17% in the course of 10 days. The release of 80% of the pesticide required 84 days (2.8 months).

What is claimed is:

1. A method for the production of water-soluble granulated chemicals with slow controlled release in water and soil, comprising:

encapsulating said chemicals with 15%–35% of a thermoplastic, biodegradable and inert polymer composition, whereby said encapsulating comprises the steps of:
mixing an inert polymer composition with said chemicals;
crushing the obtained mixture of said chemicals and said polymer composition; and
moulding the crushed mixture to form clots or granules;

whereby said polymer composition is prepared by polymerization of neutralized unsaturated carboxylic acids, or of a suitable oil, in the presence of a neutralizing agent, an amine compound and plasticizer, resulting in a polymer comprising the structure of fragment A:

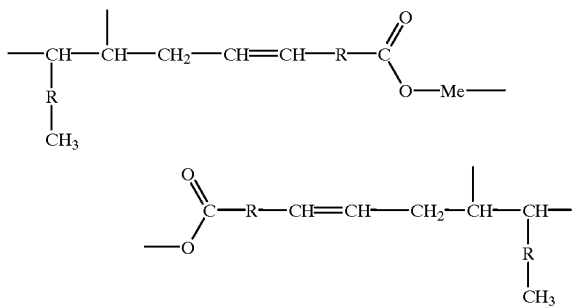

Fragment A wherein R is $C_nH_{2n}$; Me is metal; or a suitable oil thereof;

polycondensation of thiourea and formaldehyde in the presence of an amine compound and plasticizer, resulting in a polymer comprising the structure of fragment B; and

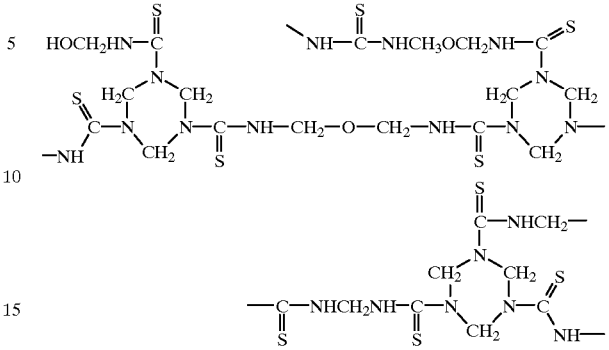

Fragment B crosslinking fragments A and B with a sulfur-containing compound.

2. A method according to claim 1 wherein said carboxylic acid is tallow oil, oleic or linoleic acid.

3. A method according to claim 2, wherein said carboxylic acid is a carboxylic acid in oxidized or sulfurated form.

4. A method according to claim 2, wherein unsaturated carboxylic acids are used in the quantity of 65%–75%.

5. A method according to claim 1, wherein oxides, hydroxides or calcium, magnesium, zinc and aluminium carbonates are used as neutralizing agents.

6. A method according to claim 1 wherein the neutralizing agent is used in the quantity of 0.7–1.1 mole per 1 mole of unsaturated carboxylic acid.

7. A method according to claim 1 wherein the amine compound is melamine, 8-oxichinoline, triethanolamine or diphenylamine.

8. A method according to claim 1 wherein the aminecompounds are in the quantity of 1.0%–5.0%.

9. A method according to claim 1 wherein the plasticizer is dibutyl phthalate, butyl acetate, ethyleneglycol, glycerin or liquid paraffin.

10. A method according to claim 1 where the plasticizers are in the quantity of 0.5%–2.5%.

11. A method according to claim 1 wherein formaldehyde is in the quantity of 1.5%–3.0%.

12. A method according to claim 1 containing thiourea in the quantity of 1.5%–3.0%.

13. A method according to claim 11 wherein the thiourea to formaldehyde are in a mole ratio of 1.5 to 5.0.

14. A method according to claim 1 wherein sulfur, sulfides or polysulfides of alkali metals are used as the cross-linking sulfur-containing compound.

15. A method according to claim 14 where the sulfur-containing compound is in the quantity of 3.0%–5.0%.

16. A method according to claim 1 wherein the polymer composition production process is carried out at about 110°–150° C. during 15–30 min.

17. A method according to claim 1 wherein the polymer composition initial softening temperature is 80°–120° C. and the viscosity is 100–130 Ps at 130° C.

18. A method according to claim 1 wherein the encapsulation is of granulated powdered chemicals with particles of 150–850 μm size.

19. A method according to claim 1 wherein said chemicals are fertilizers selected from the group consisting of urea, nitrates, potassium salts, phosphates and micronutrients.

20. A method according to claim 1 for the encapsulation of said chemicals wherein said chemicals are pesticides which are thermostable at temperatures up to 80° C.

21. A method according to claim 1 for encapsulation of individual chemicals or any combinations thereof, containing 65%–85% of the chemicals and 15%–35% of polymer composition.

22. A method according to claim 1 wherein granulated powdered chemicals are mixed with the polymer composition at 850–140° C. and moulded in an extruder at a temperature of 30°–90° C. in the heating zones.

23. A method according to claim 1 wherein the size of clots or granules is 1.5–15.0 mm.

24. A method according to claim 1 wherein a protective coating is applied to the clots or granules.

25. A method according to claim 24 where paraffin, wax, boiled oil, polymer composition, bitumen or combinations thereof serve as the protective coatings.

26. A method according to claim 25 where protective coating amounts to 1.5%–3.0% of the clots or granules by weight.

27. A method according to claim 1 wherein talc, dolomite or bentonite is used for powdering the clots or granules.

28. The product obtained according to claim 1.

29. The method of claim 1, wherein said carboxylic acids are in oxidized or sulfurated form.

30. A method according to claim 1 wherein the amine compounds are in the quantity of 2.0%–3.0%.

31. A method according to claim 9 where the plasticizers are in the quantity of 1.0%–1.5%.

32. A method according to claim 1 wherein formaldehyde is in the quantity of 2.0%–2.4%.

33. A method according to claim 1 containing thiourea in the quantity of 2.0%–2.4%.

34. A method according to claim 11 wherein thiourea to formaldehyde are in a mole ratio of 2.0 to 3.0.

35. A method according to claim 14 where the sulfur-containing compound is in the quantity of 3.5%–4.0%.

36. A method according to claim 2, wherein unsaturated carboxylic acids are used in the quantity of 70%–72%.

* * * * *